US012719349B2

(12) United States Patent
Gu et al.

(10) Patent No.: US 12,719,349 B2
(45) Date of Patent: Aug. 25, 2026

(54) DEVELOPMENT OF COMPACT AND LOW COST FULLY INTEGRATED DC-DC CONVERTER WITH RESONANT GATE DRIVE AND INTELLIGENT TRANSIENT RESPONSE

(71) Applicant: Northwestern University, Evanston, IL (US)

(72) Inventors: Jie Gu, Evanston, IL (US); Xi Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 319 days.

(21) Appl. No.: 18/302,330

(22) Filed: Apr. 18, 2023

(65) Prior Publication Data

US 2024/0356429 A1 Oct. 24, 2024

(51) Int. Cl.
*H02M 1/088* (2006.01)
*H02M 3/158* (2006.01)

(52) U.S. Cl.
CPC ........... *H02M 1/088* (2013.01); *H02M 3/158* (2013.01)

(58) Field of Classification Search
CPC .............................. H02M 1/088; H02M 3/158
See application file for complete search history.

(56) References Cited

U.S. PATENT DOCUMENTS 10,630,301 B1 * 4/2020 Bekele .................. H03L 7/0895
10,663,998 B1 * 5/2020 Salus ...................... G05F 1/613
2014/0021929 A1 * 1/2014 Lin ........................... G05F 1/10 323/271
2017/0344102 A1 * 11/2017 Kolla ...................... H02M 1/08
2018/0067532 A1 * 3/2018 Chuang ................... G06F 1/324
2018/0067541 A1 * 3/2018 Chuang ................... G06F 1/305
2021/0116982 A1 * 4/2021 Khanna ..................... G06F 1/26
2021/0124382 A1 * 4/2021 Deka ................... H02M 3/1566
2022/0100247 A1 * 3/2022 Garg ..................... G06F 1/3203
2022/0130432 A1 * 4/2022 Jayapal ................... G06F 1/305
2024/0085967 A1 * 3/2024 Gandhi ..................... G06F 1/28
2024/0094794 A1 * 3/2024 Gandhi ..................... G06F 1/28

FOREIGN PATENT DOCUMENTS

CN 113497544 A * 10/2021
WO WO-2024205928 A1 * 10/2024 .......... G06F 9/4881

* cited by examiner

*Primary Examiner* — Jaweed A Abbaszadeh
*Assistant Examiner* — Cheri L Harrington
(74) *Attorney, Agent, or Firm* — Schott, P.C.

(57) ABSTRACT

A machine learning based control scheme for a buck converter achieves fast and more energy efficient regulation of power supply change using a machine learning module that predicts upcoming supply droop or overshoot. The prediction results may be sent to a buck converter to provide power regulation in time so that the buck converter can mitigate the droop or overshoot. An event-based detection and reaction control circuit, serving as "safety net" may address mispredictions. The machine learning module may consider a microprocessor's internal operation states and earlier supply voltages. The event-based control circuit nay include both a fast droop response circuit and a slow droop response circuit that address different supply droop scenarios.

19 Claims, 11 Drawing Sheets

Proactive power management for dynamic power and supply variation and summary of contributions from this work

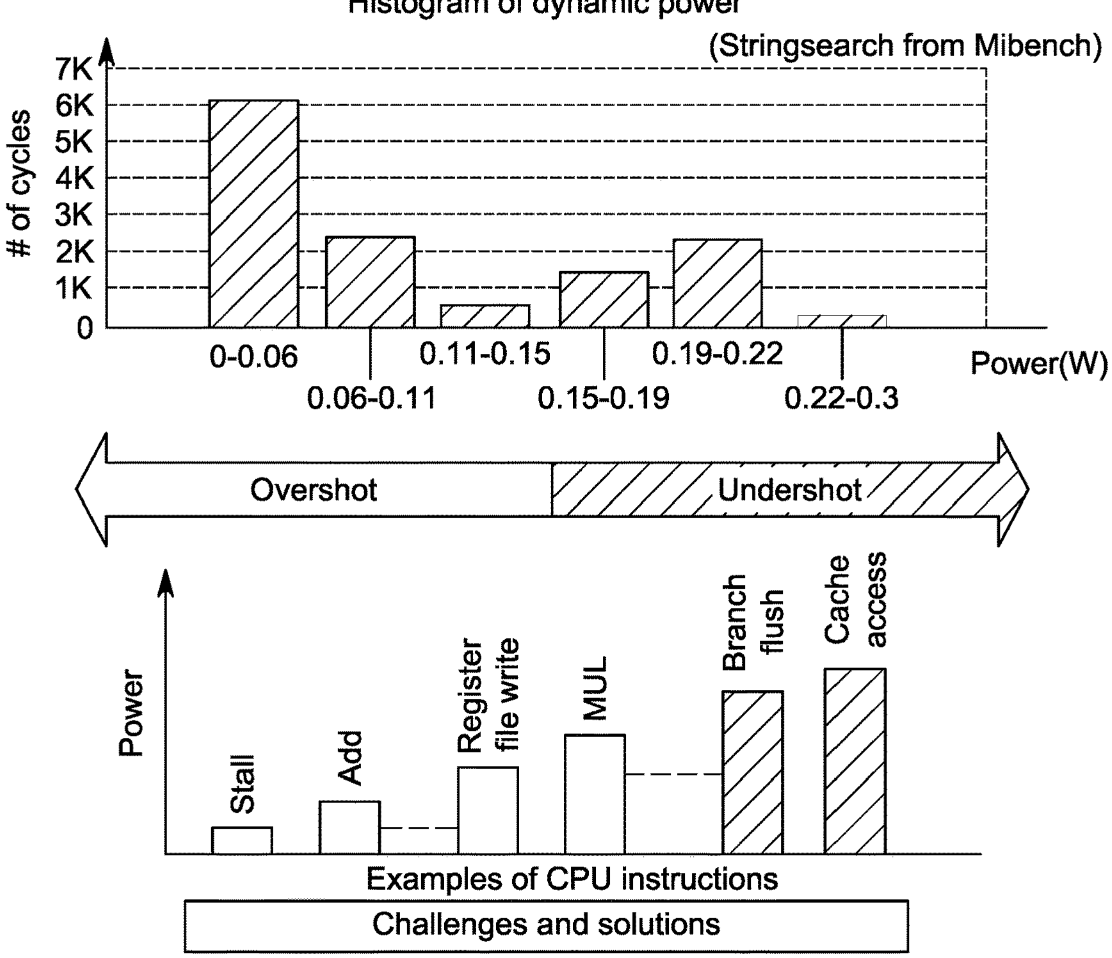

Challenges in existing work:

1. Speed limitation of converters
2. Complicated cases for power prediction
3. Performance/efficiency loss from margins

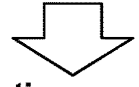

Proposed solutions and features:

1. Proactive power management
2. Machine learning based prediction
3. Fast fully-integrated buck converter with ML control and "safety net" circuits Proactive power management for dynamic power and supply variation and summary of contributions from this work

FIG. 1B

Overall architecture of the tapeout design

| Voltage range(V) | Level (V<1.08) | Level 1 (1.08<V<1.14) | Combined level 0&1 | Level 2 (V>1.14) |
|---|---|---|---|---|
| True positive rate(%) | 82.38 | 91.06 | 92.24 | 71.56 |
| False positive rate(%) | 0.86 | 4.58 | 4.68 | 0.31 |

Design details of the proposed machine learning core and prediction accuracy

Circuits inside buck converter to support ML based control including fast PWM modulation, shortterm droop guardband and long-term droop guardband Measured waveforms of supply droops with and without ML and droop guardband

Comparison with prior work

| | [1] | [2] | [3] | [4] | [6] |
|---|---|---|---|---|---|
| Process | 7nm | 22nm | 65nm | 7nm | 5nm |
| Processor | CPU/GPU/APU | N/A | N/A | DSP | ARM CPU |
| Mitigation scheme | DVFS w/ PVT Sensors | Compute LDO | Event LDO | Proactive clock gating | DVFS w/ FLL/PLL |
| Vin (V) | N/A | 0.55-1.2 | 0.5-1.0 | N/A | N/A |
| Vout (V) | N/A | 0.5-1.5 | 0.45-0.95 | N/A | N/A |
| Response time | 1ms | 1ns | 0.2ns | A few Clk cycles | μs to ms |
| Computing method | Software machine learning | Droop speed | Event detection | Equation based | N/A |
| Performance of Power Improvement | 13% | N/A | N/A | 10% | 4% |

Comparison with prior works, efficiency/ power/ frequency scaling with voltages and CPU frequency improvement from the proactive power management

FIG. 6B

DEVELOPMENT OF COMPACT AND LOW COST FULLY INTEGRATED DC-DC CONVERTER WITH RESONANT GATE DRIVE AND INTELLIGENT TRANSIENT RESPONSE

BACKGROUND

Voltage droop refers to a decrease in the voltage level in a circuit over time. This can happen when a circuit is heavily loaded and the resistance increases, causing the voltage to drop. Voltage droop is often seen in power supplies and can affect the performance of electrical devices, including microprocessors.

On the other hand, voltage overshoot refers to a sudden increase in the voltage level in a circuit. This can happen when a circuit is switched on or off, or when a sudden change in load occurs. Voltage overshoot can cause electrical devices to malfunction or be damaged.

Both phenomena can be problematic in electrical circuits and need to be carefully managed.

There are several solutions that can be used to address voltage droop in electrical circuits. One solution is to use a power supply with a higher current rating. This can help prevent the voltage from dropping as the circuit is loaded, as the power supply will be able to provide more current to the load. Another solution is to use voltage regulators, which are devices that maintain a constant voltage level in a circuit. There are various types of voltage regulators, such as linear regulators, switching regulators, and pulse-width modulation regulators. These devices work by actively adjusting the voltage level in the circuit to compensate for changes in load and prevent voltage droop. A third solution is to use power management techniques, such as load balancing and power factor correction. These techniques can help distribute the load more evenly across the circuit and reduce the overall resistance, which can prevent voltage droop. Overall, the best solution for addressing voltage droop will depend on the specific circumstances of the circuit and the needs of the electrical devices being powered.

There are also several solutions that can be used to address voltage overshoot in electrical circuits. One solution is to use a voltage clamp, which is a device that limits the maximum voltage level in a circuit. A voltage clamp typically consists of a capacitor and a diode connected in series, and it works by shunting excess voltage to the capacitor, which absorbs the excess energy and prevents it from reaching the load. Another solution is to use a snubber circuit, which is a passive circuit that is added to the main circuit to dampen voltage spikes. A snubber circuit typically consists of a resistor and a capacitor connected in parallel, and it works by absorbing the excess energy from the voltage spike and dissipating it as heat. A third solution is to use a surge protector, which is a device that protects electrical devices from voltage spikes and other transient events. A surge protector typically consists of a metal oxide varistor (MOV) or a gas discharge tube (GDT), and it works by diverting excess voltage away from the protected devices and safely dissipating it. Overall, the best solution for addressing voltage overshoot will depend on the specific circumstances of the circuit and the needs of the electrical devices being protected.

Furthermore, all electrical systems have some amount of resistance between the regulator output and the load. At high currents, a small resistance can produce voltage drop between the regulator and the load. Rather than increasing output voltage at high current to maintain the same load voltage, voltage droop allows this drop to take place. Voltage droop can be the intentional loss in output voltage from a device as it drives a load. Adding droop in a voltage regulation circuit increases the headroom for load transients.

Some solutions address power droop by supporting the dynamic frequency and voltage scaling of a processing system using a power droop controller. The power droop controller measures the current and voltage levels of the processing system and adjusts the voltage level to maintain a desired level of power. The method helps to reduce power consumption and improve system performance.

A power regulation system may use a droop controller to regulate the power output of a power supply. The droop controller monitors the input voltage, voltage drop, and output current of the power supply and adjusts the output power accordingly. The system helps to reduce power consumption and improve system performance.

A different power droop control system monitors the input voltage, current, and output voltage of a power supply. The system adjusts the output power accordingly to maintain a desired level of power and reduce power consumption. The system helps to improve system performance and reduce power losses.

Managing power droop and overshoot in a microprocessor is challenging because surges and drops may prove hard to predict and thus a need exists to better address the problem of power supply regulation to the microprocessor.

Power integrity has become a major challenge in deep complementary metal-oxide semiconductor CMOS technology where supply voltage has decreased to only 0.6V~1.0V with largely variant workload being processed in a SoC. While conventional Dynamic Voltage and Frequency Scaling (DVFS) and Adaptive Voltage Scaling (AVS) provide certain mitigation to supply events, the approaches engaging regular control loop of power converters are too slow to provide regulation to the highly supply emergencies such as sudden change of workload, resonant droop or instruction specific power surges. To combat the slowness of power converters, many earlier solutions focus on digital low-dropout regulators LDOs to provide fast regulations to supply event within a clock cycle. Examples include the computational LDO that uses the threshold crossing time to estimate the change of workload for activation of power gates. Event-based LDO schemes have also been developed to provide fast on-demand regulation to supply events.

As shown in FIGS. 1A and 1B, a speed and efficiency tradeoff between LDO and DC-DC converter can be seen where LDO offers sub-ns regulation with much lower efficiency compared with slower DC-DC converters. Prior work took the approach of "reactive" power management, which suffers from the speed limitation of detection and reaction circuits causing significant voltage margin to be maintained. Recently, a more "proactive" management has been explored. A proactive clock throttling technique was demonstrated on a DSP processor where a small digital circuit was used to predict the upcoming power surge based on instructions being processed leading to 10% frequency improvement (see figure bottom left). Similar power prediction was also used in a high-end processor for clock throttling. However, clock throttling incurs performance penalty and does not fundamentally remove the detrimental supply droop.

SUMMARY OF THE EMBODIMENTS

The work herein demonstrates a proactive power management approach with fully integrated power converters to reduce highly dynamic supply droops. As shown in FIGS. 1A and 1B, the current consumption of a microprocessor observes significant variation at cycle-by-cycle bases (see lower left). Three dimensions of dependency may be needed to predict the fine-grained supply events including (1) instruction-type dependency, (2) instruction sequence dependency, (3) voltage dependency, leading to complex computational model required for "proactive" operation. To deal with these challenges, this system herein demonstrates a comprehensive solution for proactive power management including a real-time machine learning (ML) engine for accurate droop prediction and fast fully-integrated power converter with "safety" guardband to unleash the potential of the ML technique. The proactive techniques allow actions to be taken before the happening of real events reducing the fundamental speed limitation of DC-DC converters rending 6.1%~9.9% performance improvement or 6.2%~9.2 higher regulator efficiency over prior fast LDO approaches as demonstrated by a 65 nm test chip.

A machine learning based control scheme achieves fast and more energy efficient regulation of power supply change using a machine learning module that predicts upcoming supply droop or overshoot. The prediction results may be sent to a buck converter to provide power regulation in time so that the buck converter can mitigate the droop or overshoot. An event-based detection and reaction control circuit, serving as "safety net" may address mispredictions. The machine learning module may consider a microprocessor's internal operation states and earlier supply voltages. The event-based control circuit may include both a fast droop response circuit and a slow droop response circuit that address different supply droop scenarios.

The following features may provide and/or contribute to technical solutions to the problem of droop and overshoot in microprocessors and ICs.

1. A real-time machine learning hardware module controls a power converter, which conventionally does not have the machine learning module. This machine learning module predicts upcoming supply droop or surge and modifies the piece-wise-linear modulation (PWM) signal of the buck converter to proactively regulate the supply voltage so that less supply voltage change is observed, which may be one function of the buck converter. Compared with conventional approach which is based on detection-based feedback that controls this operation, this module takes action in advance using prediction so that the response is more timely, which results in better voltage regulation and higher efficiency.

2. The system this technique applies to as described herein in an example is a system-on-chip where a fully-integrated on-chip buck converter is in the same chip as the processors that receive the power delivered from the buck converter. There is thus an efficient design that saves space. It should be understood that the system is not limited to a buck converter as described herein.

3. The machine learning core may use the following information for prediction of the upcoming power supply changes. (1) Internal operation states of the CPU including instruction related opcode, ALU control signals, cache and register file read and write enable signals, operation status signals such as branch and stall; (2) Previous a few cycles of power supply voltages. Based on this information, the machine learning core predicts the supply current and voltages a few clock cycles later, e.g. 3 clock cycles. This results again in better reactivity in the microprocessor.

4. The machine learning core may send the prediction results to the PWM control module inside the buck converter to take the actions to regulate the upcoming power supply change. This on-chip solution results in controlled and fast responsiveness within the microprocessor.

5. Because machine learning prediction is not 100% correct, a "safety net" approach referred as event-based control detects if the supply voltage reaches a threshold and takes quick action to bring the supply voltage back within the desired operation range through auxiliary power switches. Note the "safety net" may not be power efficient compared with machine learning control, so its activation may be minimized by improving the accuracy of the machine learning prediction. This safety net solutions ensures that the supply surges stay within a limit and do not further damage the microprocessor.

6. The event-based control may include a fast droop response circuit (FDR) and a slow response circuit (SDR). The FDR may be used to deal with fast supply droop within a clock cycle time frame while SDR addresses multiple clock cycle supply droop or surge with larger supply load change.

7. The FDR may use fast comparator circuits to detect the change and turn on auxiliary power switches to manage the supply voltages.

8. The SDR may detect how fast the supply droop occurs and use that information to modify the PWM signals of the buck converter to manage the supply voltages.

BRIEF DESCRIPTION OF THE DRAWINGS

FIGS. 1A and 1B show a summary of proactive power management for dynamic power and supply variation and a summary of the contributions from the proposed architecture.

FIGS. 6A and 6B show frequency improvement versus VDD based on Stringsearch program and the measured buck converter efficiency scaling running under the CPU workload.

DETAILED DESCRIPTION OF THE EMBODIMENTS

2. Overall Chip Architecture and Specifications

Figure 2A:
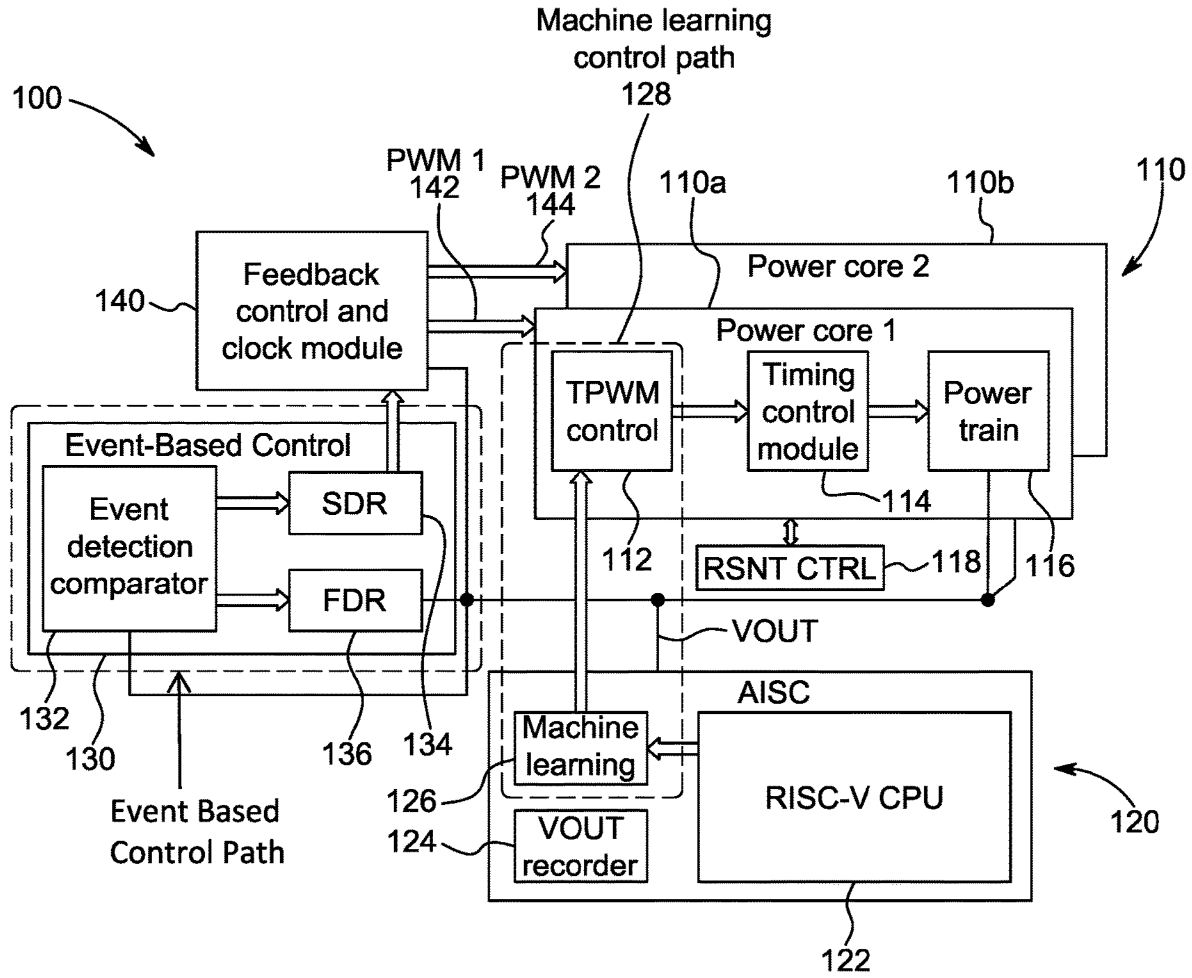
FIG. 2A shows a first embodiment of the proposed architecture.

FIG. 2A shows the circuit architecture 100. It contains the following modules:

(1) Power core modules 110. At least two power cores 110*a*, 110*b* deliver the power needed for the microprocessor 100, though one or more than two power cores may be used. The nominal output voltage is between 1.0V to 1.2V from an input of 1.8V. Each power core includes a TWIM control, timing control module, and power train.

Each power core module may include a Time Proportional Pulse Width Modulation (TPWM) control 112, a timing control module 114, and a power train 116. The TPWM control 112 regulates the power delivered by controlling the timing control module 114. The timing control module 114 generates a pulse-width modulated (PWM) signal, which is then used to control the power output of the power train 116.

The timing control module 114 generates the PWM signal with a varying the duty cycle or ratio of on time to off time of the signal as directed by the TPWM control 112. The duty cycle may be adjusted based on the desired power output and as directed by the TPWM control 112, with higher duty cycles resulting in higher power output.

Although technically not part of the four modules discussed herein, a RSNT (Rapid-Speed Non-Tripping) control 118 is a circuit breaker control that is designed to reduce the time required to trip a circuit breaker and restore power to each power core. The RSNT control works by monitoring the power supply to the circuit and triggering the circuit breaker to trip when the power exceeds a predetermined threshold. The use of an RSNT control 118 ensures that the circuit is not overloaded and the power is restored quickly in the event of an overload.

(2) Application-Specific Integrated Circuit (ASIC) Core Module 120

The ASIC core 120 may contain two sub-modules. The first is a Reduced Instruction Set Computer-V (RISC-V) central processing unit (CPU) 122. A RISC-V provides a low-cost, low-power, and flexible solution for implementing custom instruction sets for a given application as a load. A VOUT (Voltage out) recorder 124 records the output voltage Vout from a regulator is measured by fast comparators and the comparator results to help monitor real-time supply voltages during the circuit 100/s operation. The voltage from the RISC-V CPU 122 and recorded Vout from the VOUT recorder 124 are transmitted to the machine learning submodule 126. From this input, the machine learning module 126 determines a voltage prediction target that it monitors and when necessary, transmits instructions to the TPWM control 112 to adjust the power output in a power core 110 in anticipation of a drop or overshoot. (This disclosure explains this in more detail below.)

The machine learning sub-module 126 and the TPWM control 112 make up a machine learning control path 128 that learns to anticipate droop and overshoot and controls the power cores 110 to avoid problems related thereto.

(3) Event-Based Droop Control Module 130

An event-based supply droop control module 130 includes an event detection comparator 132, slow droop response (SDR) circuit 134 and fast droop response (FDR) circuit 136. The event-based control module 130 provides a backup solution where the machine learning submodule 126 fails to bring voltage back following a droop or overshoot due to a misprediction by the system. The event detection comparator 132 receives the voltage droop information and feeds that to the SDR and FDR circuits. Two types of voltage droops are dealt with using the event-based droop control modules including fast droop response circuit (FDR) 136 and slow droop response circuit (SDR) 134 for control of fast transient events and slow transient events. Note: The equivalent SDR and FDR in FIGS. 2BA and 2BB are the short and long guardband modules discussed below.

(4) Feedback and Control Clock Module 140

The feedback and control clock module 140, based on a control signal from the event-based control module 130 and specifically the SDR circuit 134, sends the piece-wise-linear modulation (PWM) signal to the power core modules 110, which may be further controlled by the TPWM control 112, as previously discussed.

(5) Other Supporting Modules

Other supporting modules may also be included in the design including scan chain, IO, and a DCO for generating ASIC's clock.

Figure 1A:
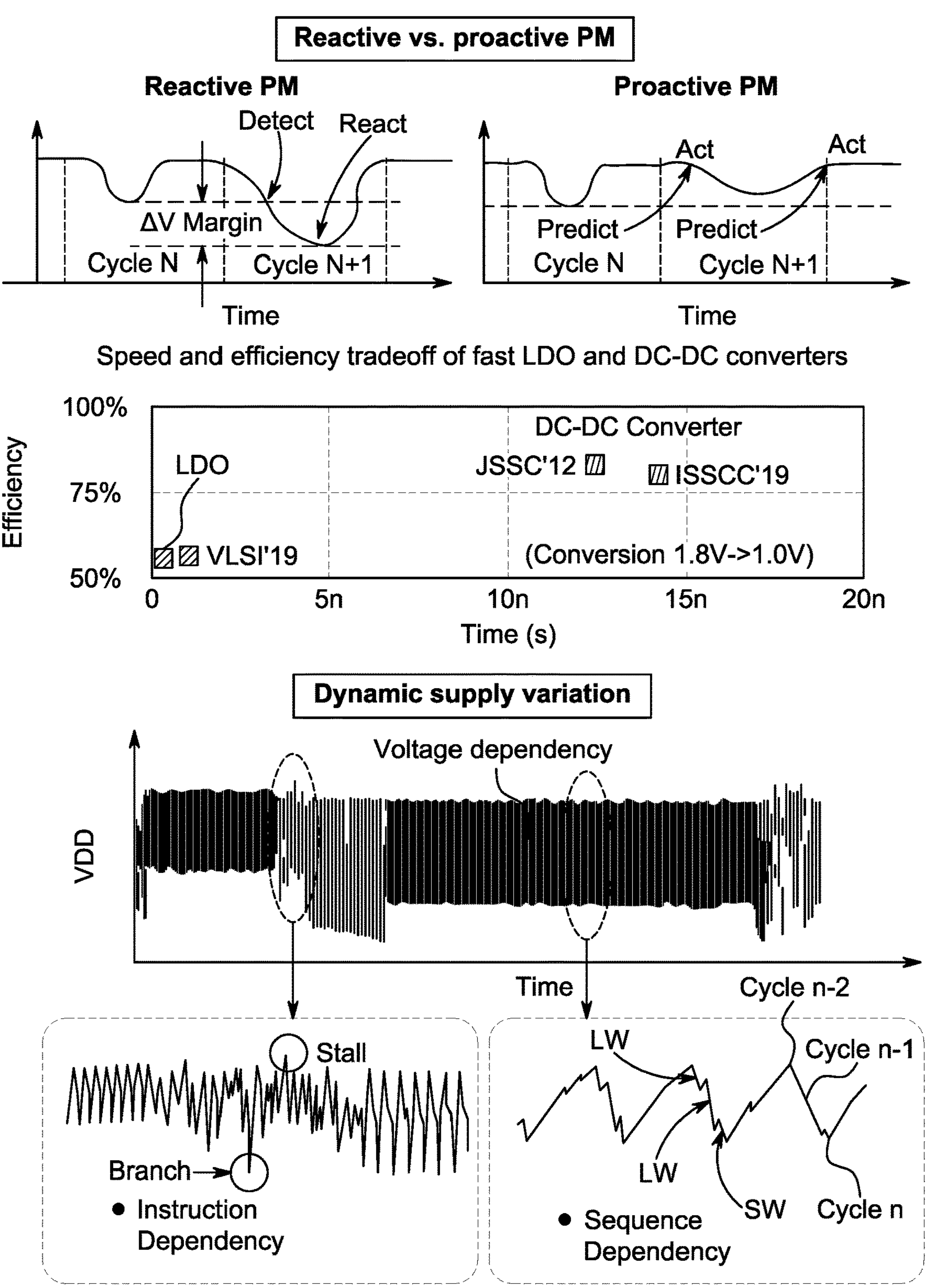

As shown in FIGS. 1A and 1B, the machine learning submodule 126 may be built together with RISC-V CPU 132. The real-time operation signals from the CPU 122 may be fed into the machine learning submodule 126 to predict the cycle-by-cycle power of the CPU 122. A total of 52 bits of runtime internal signals from CPU may be selected to send to the machine learning core which will generate the prediction of CPU current that will happen at two clock cycles later. The prediction is based on a trained linear regression model. The 52-bit signals may be selected based on an Innovus simulation of the ASIC design and include CPU Opcode, ALU Ctrl bits, cache and register file read or write enable signals, branch and stall flags, etc.

The prediction of CPU current may be sent to the main regulator module to combine with the measured voltage level from comparators on the fly to generate predicted supply voltage value. Based on the predicted supply voltage, the feedback control and clock module 140 sends the 2-bit control signals 141, 142 to the TPWM module 112 to provide modulation of PWM signals to compensate for predicted voltage droop.

The event-based droop control (and similar guardband discussed with reference to FIGS. 2BA and 2BB) serves as a "safety net" to control the voltage in the circuit when machine learning core 126 fails to provide adequate regulation. It contains three main components (1) comparators for voltage detection 132, (2) a fast droop response circuit module 136, and (3) a slow droop response circuit module 134.

To achieve an effective slow droop response, the main PWM circuits may be enhanced by directly offsetting a current PWM signal value by a value based on how fast the droop is. In this way, the time across the two thresholds may be used to determine the magnitude of the PWM phase change. Said another way, when Vout crosses 2 thresholds within a certain period (either overshot and overshot_ex or undershot and undershot_ex), a 2-bit event control signal may be generated to reset the duty cycle of PWM. The SDR circuit 134 may takes 2~3 ns to regulate but provide long-term regulation to the supply condition, e.g. a sudden increase of load.

Figure 2B:
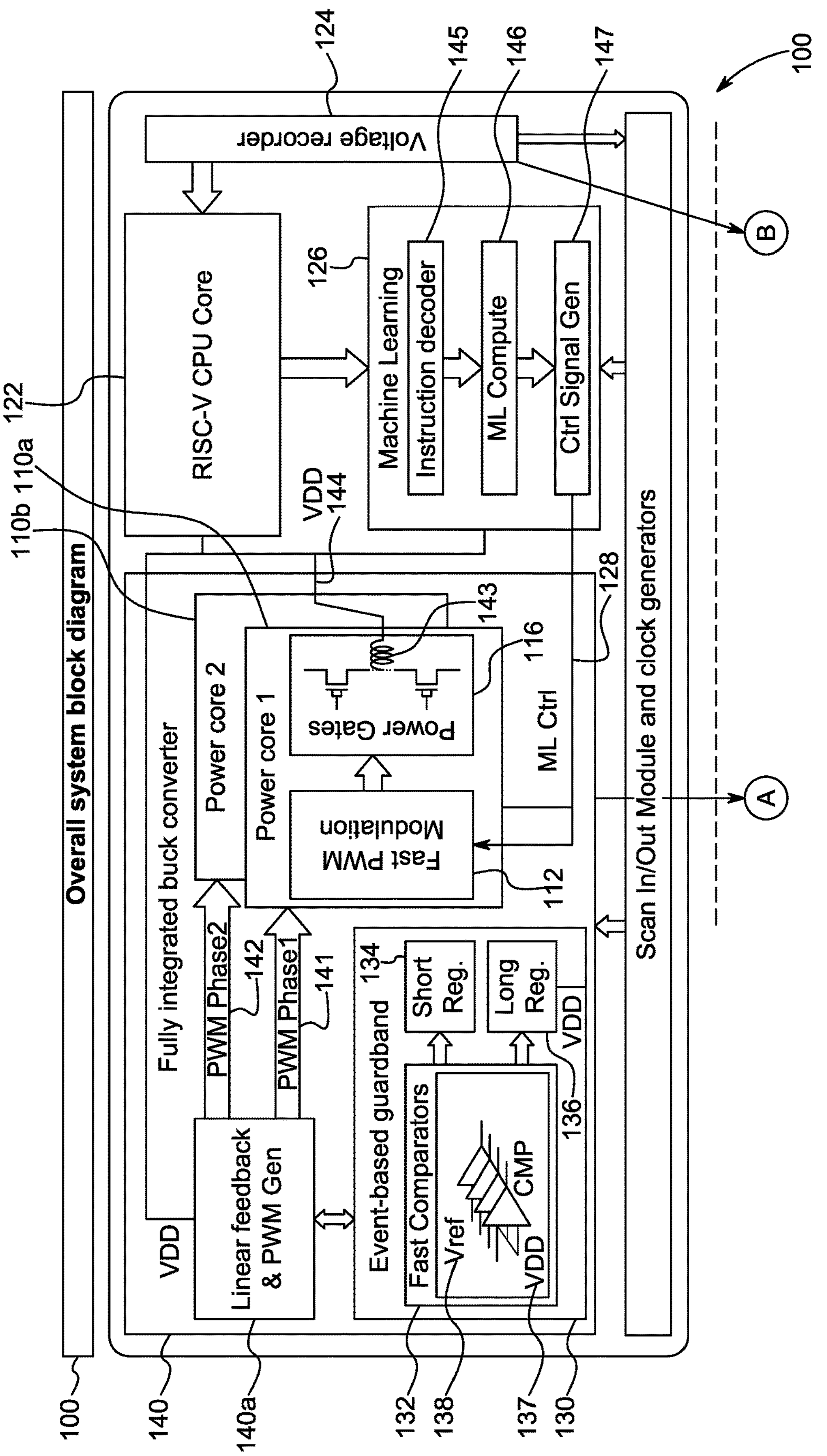
FIGS. 2BA and 2BB show a second embodiment of the proposed architecture.

FIGS. 2BA and 2BB show an alternate embodiment of the architecture, where similar numbers indicate the same items, it being understood that similar modules and elements may be interchangeable with those mentioned in FIG. 2A, as would be known to a person of skill in the art.

FIGS. 2BA and 2BB show the overall test chip architecture 100 of the proposed scheme. A RISC-V CPU core 122 running at 833 MHz with 24 kB memory was implemented as the test vehicle generating workload with a nominal power around 145 mW. The RISC-V CPU 122 may be powered by a fully integrated buck converter 150 that includes a typical feedback control loop at 10 MHz and a fast PWM signal generator 140*a* generating PWM signals 141, 142 at 0.61 GHz for two-phase interleaved power cores 110*a*, 110*b*. The power cores 110*a*, 110*b*, which use stacked power switches with core transistors 116 and fully integrated on-chip inductors 143 (see the detailed view in FIG. 2BA), receive an IO input voltages of 1.8V and generate output voltages from 1.4V to 0.6V for core VDD 144. A special real-time ML core 126 may be used to generate the prediction of supply droop based on the CPU's activities. The ML core 126 firstly takes the instructions from RISC-V CPU 122, and then collects the critical information of them through a instruction decoder 145. After that, decoded information is sent to computing stage 146 calculating the prediction of the current. Finally, a 2-bit control signal 128 is generated from control signal generator 147 and sent to a fast PWM modulation (FPWMM) module 112 inserted between the original PWM generator 140 and power cores 110*a*, 110*b* to provide ultra-fast modulation to the PWM signals for modulation of inductor current from the buck converter 140.

Event-based guardband circuits 130 may include (a) a short-term droop guardband 134 and (b) a long-term droop guardband 136 to deal with false negative prediction of the machine learning core 126, serving as "safety net" of the operation. A fast comparator array 132 near RISC-V CPU will compare the real-time supply 137 with a reference 138 to provide fast activation for "safety net". For testing purpose, a fast cycle-by-cycle thermometer 4-bit voltage recorder 124 may be implemented on the chip to record real-time voltage droop information for up to 2000 cycles.

Figure 2B:
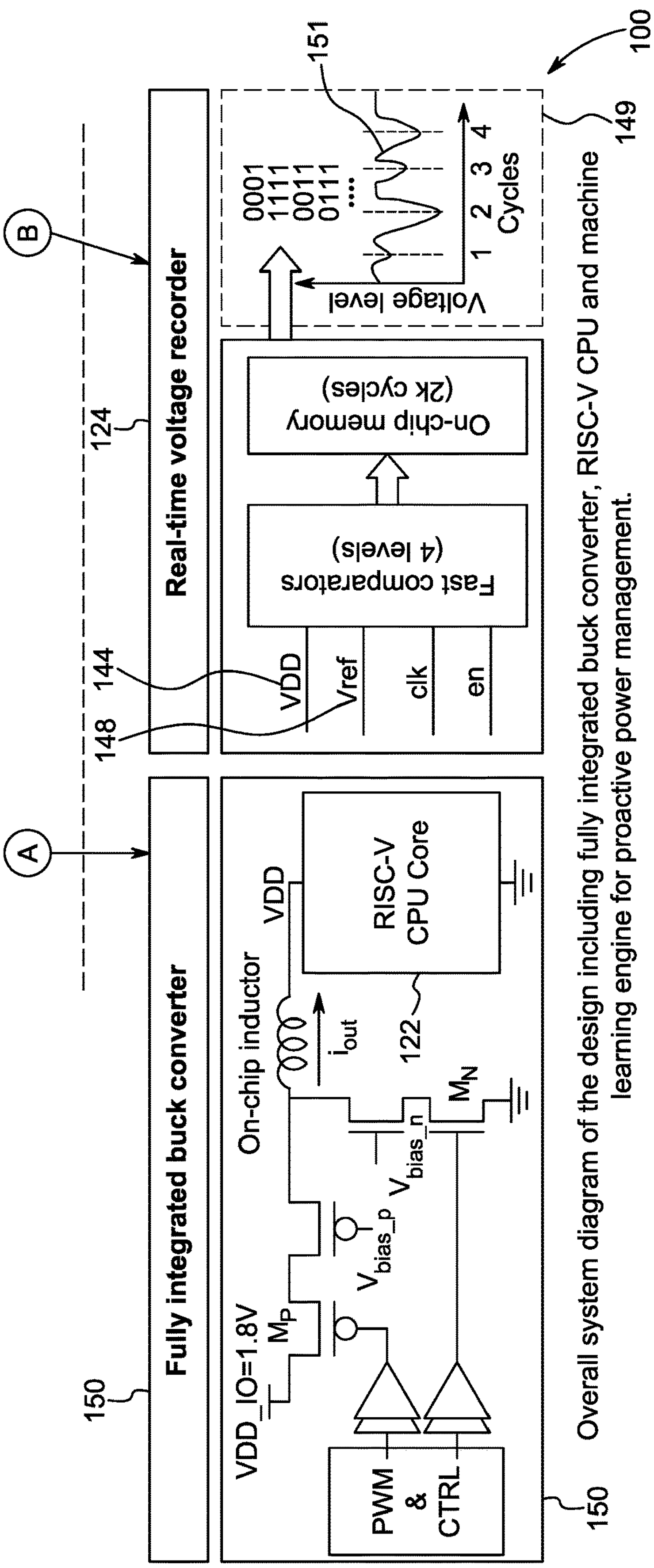

FIG. 2 also shows the detailed information of the voltage recorder 124. The supply voltage of the RISC-V CPU 122 is sent to a 4-level fast comparator compared with external reference static voltage 148. The comparison results is latched by a clock with same frequency of RISC-V CPU 122 and further sent to a on-chip memory bank. Off-chip decoding 149 will generate a waveform indicating the voltage trend 151 of the recording period.

Figure 3:
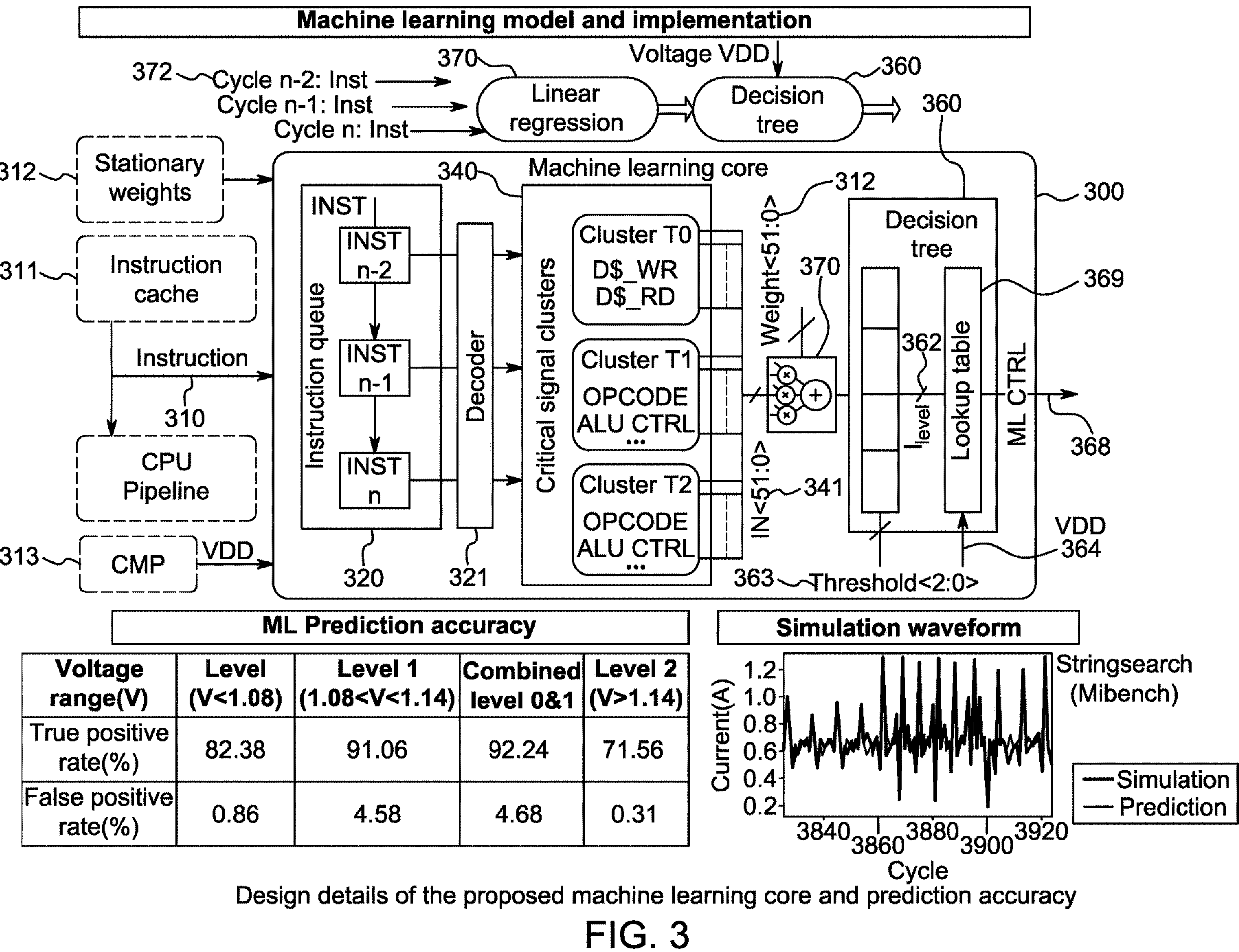
FIG. 3 shows the detailed design of the real-time ML core.

FIG. 3 shows the detailed design of the real-time ML core 300. The fetched instructions 310 from instruction cache 311 are sent into the ML core 300 for prediction providing 3~4 cycles lead time before the instruction is being executed generating power events in either execution (EX) stage or memory write back stage (MEM). To deal with the power dependency on instruction type and instruction sequence, the decoded instructions may be kept in an instruction queue 320 for the past three instructions 372. The instruction information may be sent to a decoder 321 and further grouped into clusters of signals 340, i.e. critical instruction "features" such as ALU activities, memory load/store activities, etc. for feeding into ML calculation.

A total of 52 1-bit real-time "feature" signals 341 may be sent into a linear regression core 370 with off-line trained weights 312 to predict the upcoming current consumption of the CPU. The regression result is then sent into a decision tree 360 realized by a lookup table 369. The decision tree combines the current prediction 362 differentiated by external threshold 363 and measured real-time voltage 364 from a fast comparator 313 to generate a 2-bit control signal 368 representing the predicted voltage level. The ML core issues the final control signal 368 to the buck converter 150 for taking actions within 1 or 2 clock cycles depending on the instruction type. For reducing power overhead, 4-bit stationary weight and 1-bit inputs may be used for regression calculation rendering multiplier-less ML calculation. The ML model may be trained offline by a joint analog and digital simulation framework and is further adjusted based on silicon characterization data. As shown in FIG. 3 bottom left, the inventors observed an accuracy of 92.24% for an undershot in testing. Compared with a 2-layer neural network model, the deployed ML model observes 5% accuracy lost but 16× power reduction. The ML core introduces 2.4~3.5% power overhead to the RISC-V CPU based on the silicon measurement result.

As shown in the waveform portion of FIG. 3, the comparison between real processor current and the system's predicted current matched well.

Figure 4:
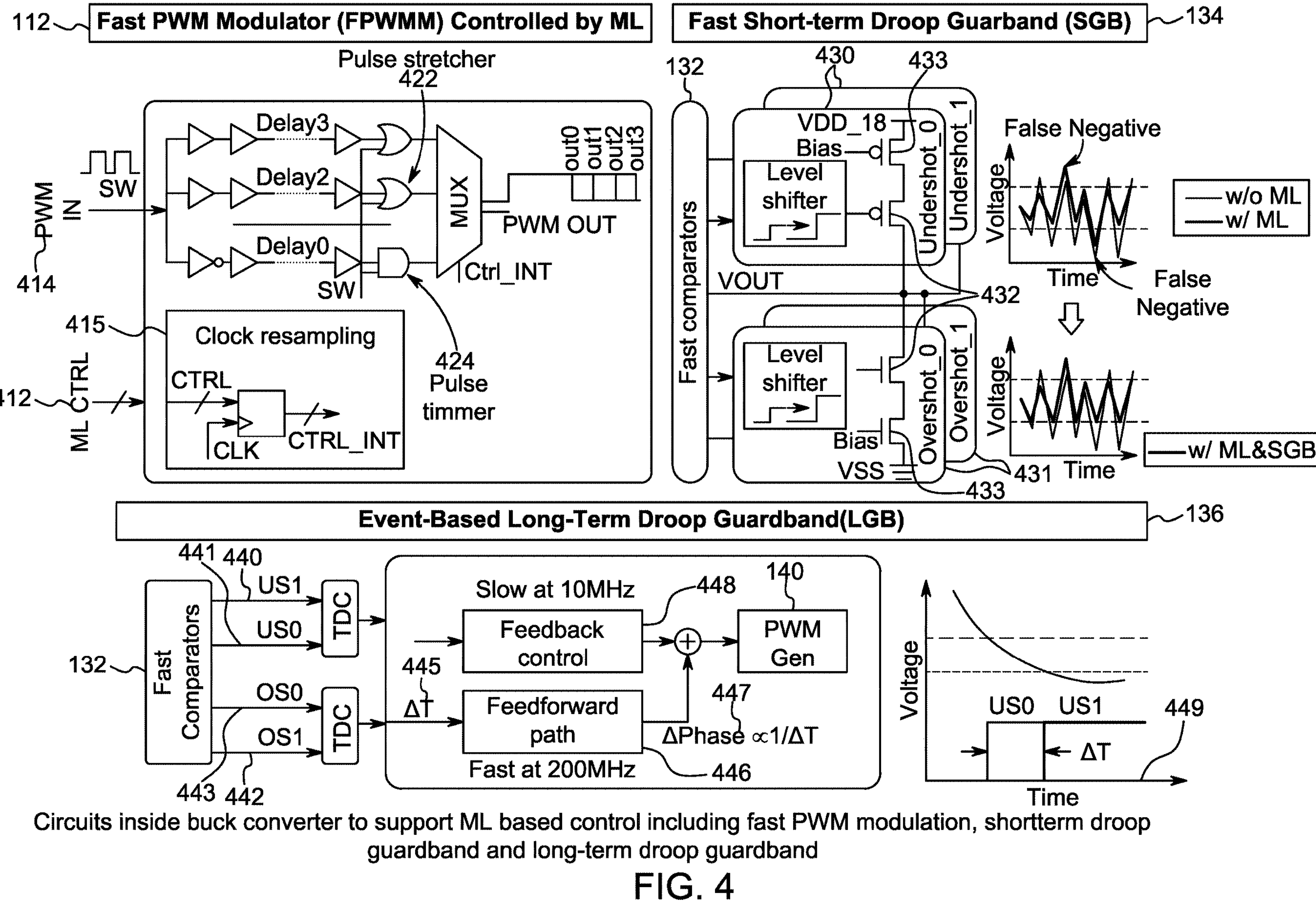
FIG. 4 shows the main circuits inside the buck converter supporting the ML operation.

FIG. 4 shows the main circuits inside the buck converter 150 supporting ML operation. The FPWMM 112 receives the control signal from ML core 412 and modulates the PWM signals 414 from a PWM generator (140*a* in FIG. 2). A time-domain programmable pulse stretcher 422 or "trimmer" 424 are used to dynamically modify the PWM signal 414 through simple delay lines and AND or OR gates within a latency of only half a clock cycle. A clock resampling model 415 is used to synchronize the clock domains between ML core 412 and FPWMM 112 To deal with the occasional misprediction of ML, a short-term droop guardband (SGB) 134 is implemented to bring the voltage back immediately during supply undershoot or overshoot. Results from fast comparators 132 are firstly sent to a level shifter which transfer the voltage level from RISC-V CPU supply to IO power supply and then sent to strong power gates to pull back the supply voltages with a transient delay of less than 300 ps. In SGB, pull-up power switches 430 and pull-down power switches 431 are used to bring the voltage back into a predetermined "normal" range. The switches may include a main switch 432 transistor and a bias transistor 433 for avoiding high voltage falling onto the single core transistor.

As the SGB bypasses inductors, it causes efficiency loss similar as LDO and hence may be activated as infrequently. SGB directly uses transistors to pull up or pull down output voltage. It does not use an inductor as the main power converter. So whenever SGB is used, the efficiency of power converter is dropped. Hence, the system may need to reduce the frequency that SGB is turned on.

As SGB provides a remedy to cycle-by-cycle events, for long-term droop, e.g. when the CPU is suddenly turned on, an event based long-term droop guardband (LGB) 136 may also be deployed to detect and mitigate the slower but larger power change. For LGB 136, a state machine is engaged based on the duration 445 of the voltage crossing of two reference voltage thresholds, i.e. us1 440 and us0 441 for undershot, or os1 442 and os0 443 for overshot. If the supply droop is not recovered within one clock cycle, a long-term droop event may be considered. A feedforward path 446 inside the buck converter may be triggered to feed an additional duty cycle offset 447 to the PWM generator 140*a* bypassing the slow control loop. The additional offset 447 is calculated to be inversely proportional to the crossing time of the voltage references. Compared with the linear feedback control 448 of 10 MHz, LGB achieves operational frequency up to 200 MHz. The figure on the bottom left of FIG. 4 shows the definition of the time of voltage crossing 2 reference 449.

Figure 5:
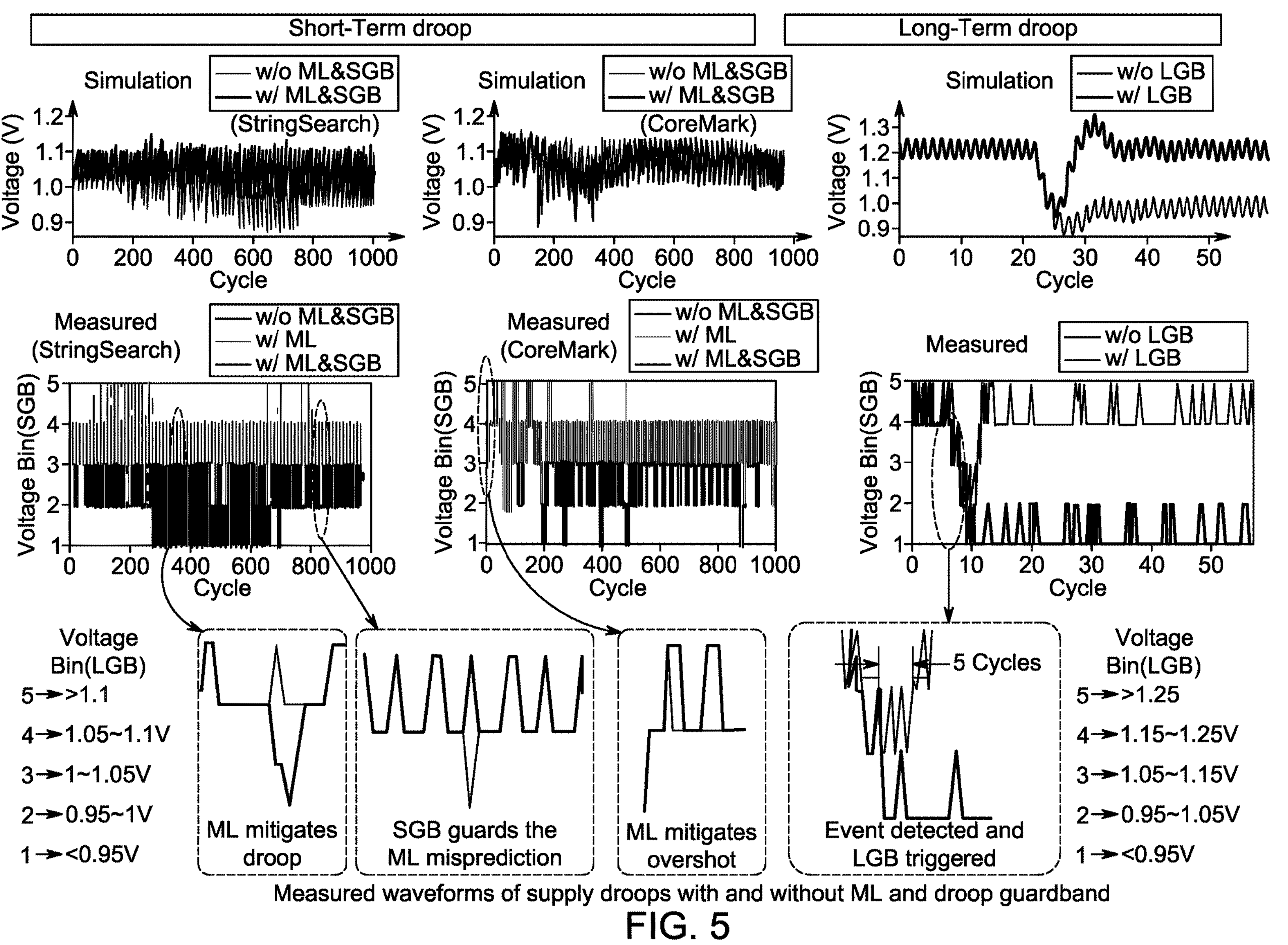
FIG. 5 shows the measured waveforms from on-chip voltage recorder in comparison with simulation results for two benchmark programs.

The inventors fabricated a 65 nm test chip as a demonstration. Individual modules were first verified separately and then jointly verified. The CPU functionality was verified by running benchmark programs and scanning out all internal register files and caches. FIG. 5 shows the measured waveforms from on-chip voltage recorder in comparison with simulation results for two benchmark programs, i.e. Stringsearch from Mibench database and CoreMark from EEMBC database. Three modes of operations were captured including (1) baseline without ML or SLG, (2) operation with ML core but without SLG, (3) operation with both ML core and SLG. As shown in the captured waveforms, the measured voltage droop matches closely with simulation. Limited by the resolution of voltage recorder, a 50 mV~100 mV (~80 mV in simulation), VDD droop reduction was observed when both ML and SLG was used. The SGB was triggered at 1% of the time (about 10 out of 1 k cycles) providing effective safety for machine learning operation with negligible power loss. FIG. 5 also shows LGB performance for reducing large droop event where a jump of load was activated from 5 mW to 150 mW. The LGB effectively brought back the supply droop within 5 clock cycles (6 ns).

Figure 6A:
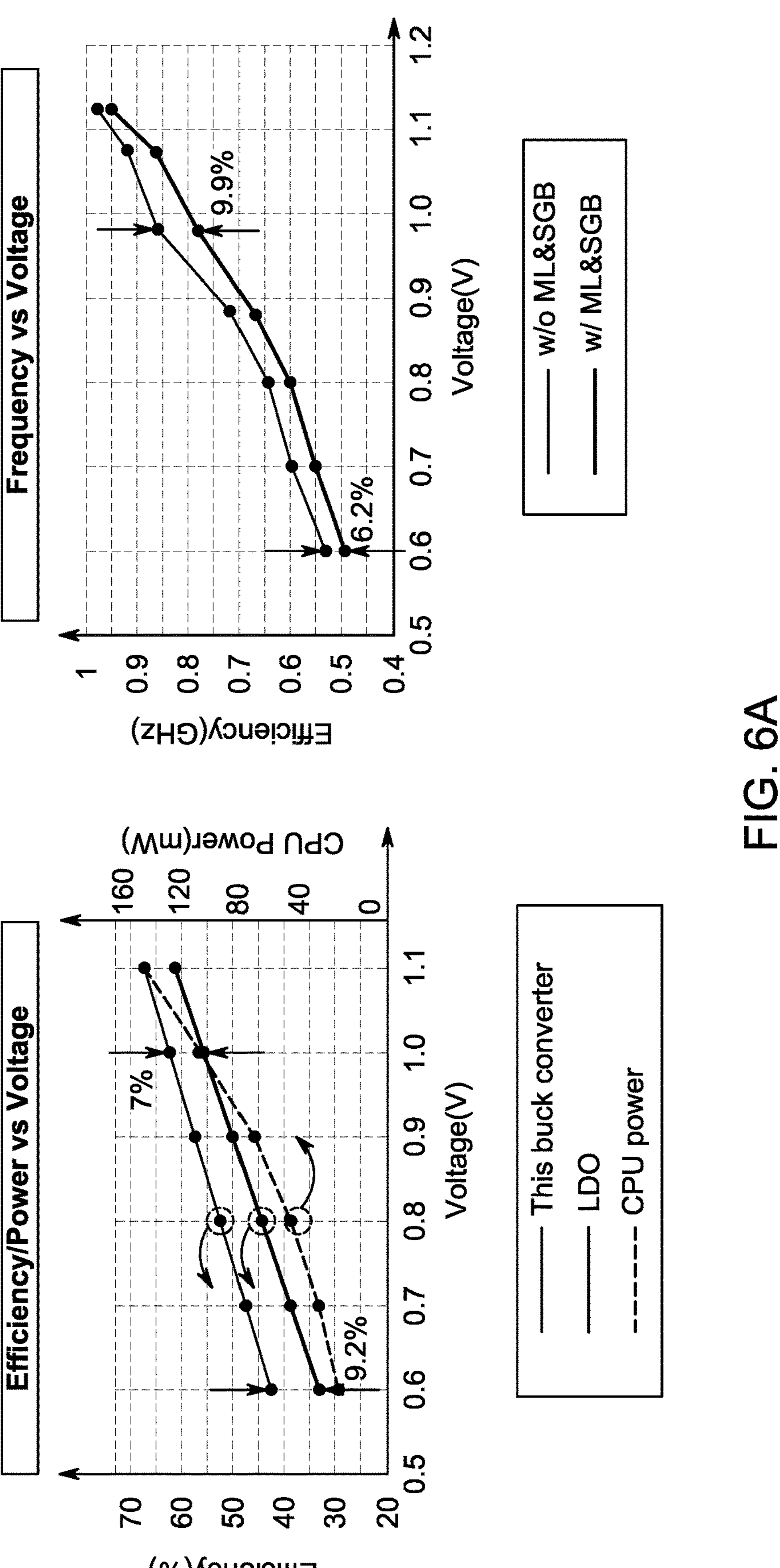

FIGS. 6A and 6B show frequency improvement versus VDD based on Stringsearch program and the measured buck converter efficiency scaling running under the CPU workload. With ML and SGB turned on, supply droop was mitigated leading to a frequency improvement from 6.1%~9.9% between 0.6V and 1.2V. Proactive ML approach enabled the use of slower buck converters with 7% to 9.2% higher efficiency compared with LDO which would have been used in this design for providing cycle-level droop mitigation based on prior fast digital LDO methods. A comparison with prior adaptive power or clock management work was shown in FIGS. 6A and 6B. This is the first work utilizing proactive power management technique for supply droop mitigation.

Figure 7:
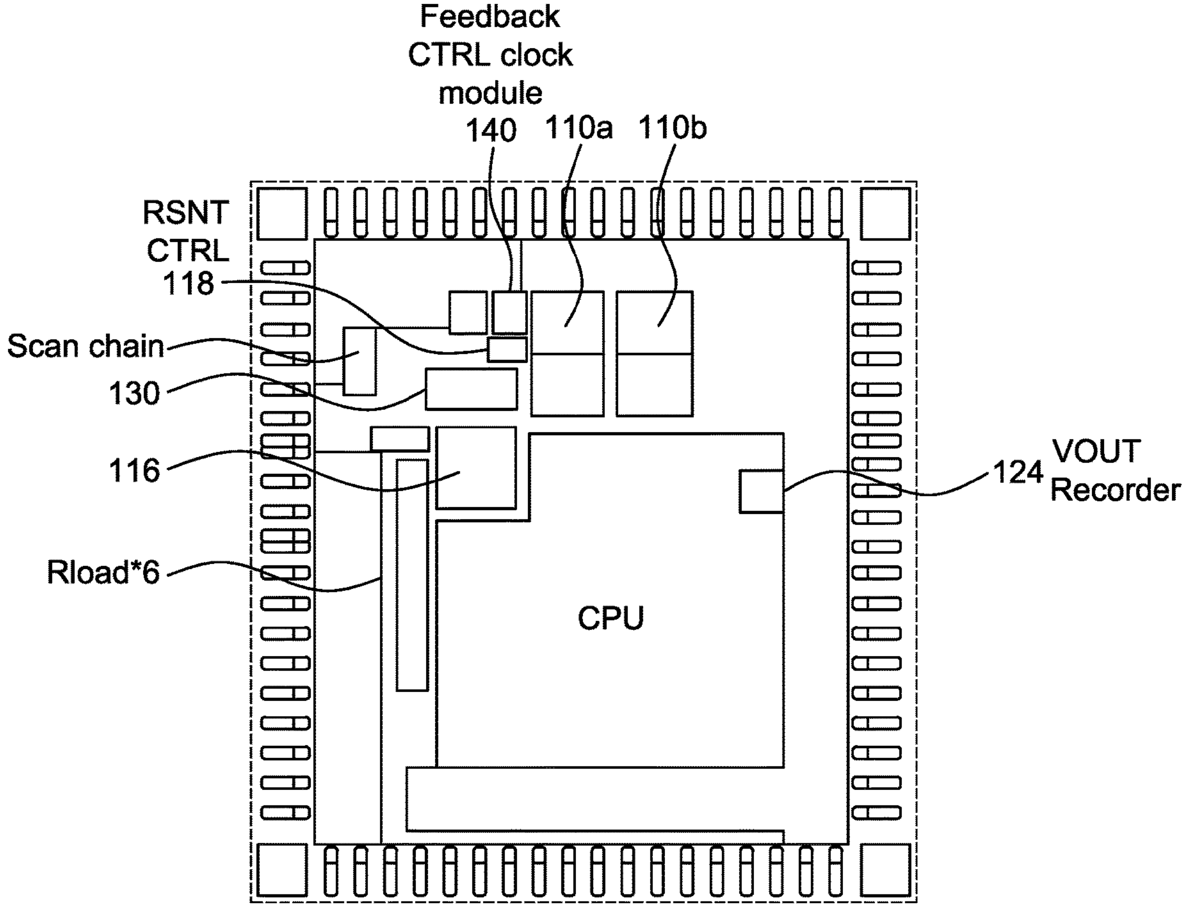
FIG. 7 shows a layout of a chip.

FIG. 7 shows an example layout of the test chip, which has suggested dimensions of 1.9 mm by 2 mm and some of the modules previously mentioned. Other layouts are possible.

The system and apparatus described herein can be used with as a replacement for commercial converters and can be uses with circuits that regulate supply voltage change.

While the invention has been described with reference to the embodiments above, a person of ordinary skill in the art would understand that various changes or modifications may be made thereto without departing from the scope of the claims.

We claim:

1. A circuit including machine learning assisted voltage supply regulation comprising:

a machine learning control circuit configured to predict anticipated voltage supply droop and overshoot in the circuit;

a buck converter configured to provide voltage regulation to the circuit, wherein the buck converter's voltage regulation is based on predictions made by the machine learning control circuit, and wherein the machine learning control circuit is further configured to modify a piece-wise-linear modulation (PWM) signal of the buck converter to regulate the supply voltage;

an event-based detection and reaction guardband control circuit operating independently of the machine learning control circuit and configured to compare a measured voltage of the circuit to a predetermined voltage reference threshold using a plurality of voltage comparators, and, if the measured voltage crosses the predetermined voltage reference threshold, to control the voltage in the circuit to bring the measured voltage within the predetermined voltage reference threshold, wherein the event-based detection and reaction guardband control circuit is further configured to:

offset a current PWM signal value based on a rate of voltage droop, and generate a multi-bit event control signal based on a number of detected threshold crossings to reset the PWM when the measured voltage crosses two or more predetermined voltage thresholds within a defined time period;

wherein the multi-bit event control signal encodes a number of voltage threshold crossings detected within the defined time period.

2. The circuit of claim 1, wherein the comparison is performed using the plurality of voltage comparators configured to detect crossings of the predetermined voltage reference threshold.

3. The circuit of claim 2, wherein the event-based detection and reaction guardband control circuit further comprises a short-term droop guardband (SGB) activated when a first predetermined voltage threshold associated with voltage droop or overshoot is crossed.

4. The circuit of claim 3, wherein the event-based detection and reaction guardband control circuit further comprises a long-term droop guardband (LGB) configured to detects larger voltage differences than the short-term droop guardband (SGB).

5. The circuit of claim 4, wherein the long-term droop guardband (LGB) is activated if voltage supply droop is not recovered within one clock cycle after the threshold crossing.

6. The circuit of claim 1, wherein the machine learning control circuit controls power cores within the circuit that generate the voltage in the circuit.

7. The circuit of claim 1, wherein the event-based detection and reaction guardband control circuit comprises an event detection comparator configured to receives the voltage droop information and shares distribute the information to a slow droop response (SDR) circuit and a fast droop response (FDR) circuit.

8. The circuit of claim 1, wherein the machine learning control circuit receives instructions from a CPU that affect the prediction.

9. The circuit of claim 8, wherein the instructions include CPU ALU activities.

10. A method of controlling voltage supply regulation in a circuit comprising:

supplying a voltage to the circuit;

predicting, using a machine learning control circuit, an anticipated voltage supply droop and overshoot in the circuit;

regulating the supplied voltage using a buck converter, wherein the regulation is based on the prediction made by the machine learning control circuit, and wherein the machine learning control circuit modifies a piece-wise-linear modulation (PWM) signal of the buck converter to regulate the supply voltage;

comparing a measured voltage of the circuit to a predetermined voltage reference threshold using a plurality of voltage comparators of an event-based guardband control circuit operating independently of the machine learning control circuit, and if the measured voltage crosses the predetermined voltage reference threshold, controlling the voltage in the circuit to bring the measured voltage within the predetermined voltage reference threshold;

offsetting a current PWM signal value based on a rate of voltage droop; and generating a multi-bit event control signal based on a number of detected threshold crossings to reset a duty cycle of the PWM when the measured voltage crosses two or more predetermined voltage thresholds within a defined time period;

wherein the multi-bit event control signal encodes a number of voltage threshold crossings detected within the defined time period.

11. The method of claim 10, wherein a buck converter provides the voltage regulation.

12. The method of claim 10, wherein an event-based detection and reaction guardband control circuit performs the comparing of the measured voltage to the predetermined voltage reference threshold.

13. The method of claim 12, wherein the comparing is performed using the plurality of voltage comparators.

14. The method of claim 12 wherein the event-based detection and reaction guardband control circuit controls the voltage to bring the measured voltage within the predetermined voltage reference threshold.

15. The method of claim 12, wherein the event-based detection and reaction guardband control circuit further comprises a short-term droop guardband (SGB) activated when a first voltage threshold is crossed.

16. The method of claim 15, wherein the event-based detection and reaction guardband control circuit further comprises a long-term droop guardband (LGB) configured to detects larger voltage differences than a short-term droop guardband (SGB).

17. The method of claim 16, wherein the long-term droop guardband (LGB) is activated if voltage droop is not recovered within one clock cycle.

18. The method of claim 10, further comprising controlling power cores within the circuit that generate the voltage in the circuit.

19. The method of claim 10, further comprising receiving voltage droop information and distributing the information to a slow droop response (SDR) circuit and a fast droop response (FDR) circuit.

* * * * *